(12) United States Patent
Wargo

(10) Patent No.: US 7,931,137 B2
(45) Date of Patent: Apr. 26, 2011

(54) CASE TURNER FOR A ROLLER CONVEYOR

(75) Inventor: Stephen G. Wargo, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 91 days.

(21) Appl. No.: 12/431,434

(22) Filed: Apr. 28, 2009

(65) Prior Publication Data
US 2010/0270122 A1    Oct. 28, 2010

(51) Int. Cl.
B65G 47/244    (2006.01)
(52) U.S. Cl. ...................................... 198/416
(58) Field of Classification Search .......... 198/412, 198/415, 416
See application file for complete search history.

(56) References Cited

U.S. PATENT DOCUMENTS

| | | | | |
|---|---|---|---|---|
| 2,761,542 A | * | 9/1956 | Pagdin | 198/416 |
| 2,805,753 A | * | 9/1957 | Palmer | 198/374 |
| 3,224,555 A | * | 12/1965 | Standley et al. | 198/415 |
| 3,332,531 A | * | 7/1967 | Chaney | 198/416 |
| 3,610,404 A | | 10/1971 | Fleischauer | |
| 4,085,839 A | * | 4/1978 | Crawford | 198/410 |
| 4,930,615 A | * | 6/1990 | Nash | 198/411 |
| 4,958,717 A | * | 9/1990 | Everhart | 198/416 |
| 5,012,915 A | * | 5/1991 | Kristola et al. | 198/411 |
| 5,660,262 A | | 8/1997 | Landrum et al. | |
| 6,253,905 B1 | | 7/2001 | Pelka | |
| 6,253,909 B1 | | 7/2001 | Kalm et al. | |
| 6,290,053 B1 | * | 9/2001 | Caporali et al. | 198/411 |
| 6,659,264 B2 | * | 12/2003 | Pelka | 198/456 |
| 6,935,484 B2 | * | 8/2005 | Davis et al. | 198/416 |
| 7,111,722 B2 | * | 9/2006 | Burch | 198/411 |
| 7,114,613 B2 | | 10/2006 | Brouwer et al. | |
| 7,249,671 B2 | * | 7/2007 | Riddick et al. | 198/457.05 |

FOREIGN PATENT DOCUMENTS
GB    2037245 A    *    7/1980
* cited by examiner

Primary Examiner — Mark A Deuble
(74) Attorney, Agent, or Firm — James T. Cronvich

(57) ABSTRACT

A case turner comprising a powered roller conveyor with a bump turn and a tapered roller just downstream of the bump turn to assist in turning cases completely 90°. The larger diameter of the tapered roller is on the opposite side of the conveyor from the bump turn.

11 Claims, 1 Drawing Sheet

CASE TURNER FOR A ROLLER CONVEYOR

BACKGROUND

The invention relates generally to power-driven conveyors and, more particularly, to powered roller conveyors with case-turning obstructions.

Powered rollers conveyors are used to convey articles or cases, such as mail trays. In some instances, it is necessary to rotate the cases 90° as they are being conveyed. An obstruction extending over the conveyor in a position to intercept a case is used to define a pivot about which the cases can rotate. The obstruction may take the form of a turning wheel at the end of an arm positioning the wheel over the conveyor into the flow of cases. Cases pivot about the wheel's vertical pivot axis away from the arm by the action of the powered rollers on the bottoms of the supported cases. Lightweight cases, however, are more likely than heavier packages with the same footprint to pivot less than 90°. And cases that don't complete their pivot are improperly oriented for proper downstream handling.

Thus, there is a need to improve the operation of powered-roller case turners, especially with lightweight cases.

SUMMARY

This need and other needs are satisfied by a case turner embodying features of the invention. One version of such a case turner comprises a powered roller conveyor that includes opposite first and second sides defining the width of the conveyor and a plurality of rollers having axes of rotation perpendicular to the first and second sides. The rollers are spaced apart along the length of the roller conveyor and rotate to convey supported cases along the length of the conveyor in a downstream direction. An obstruction defines a vertical pivot axis along the conveyor at a position closer to the first side of the conveyor. Cases in contact with the obstruction pivot about the pivot axis toward the second side as the supporting rollers rotate. At least one of the rollers is an assist roller disposed downstream of the pivot axis. The assist roller rotates at a higher tangential speed at the second side of the conveyor than at the first side of the conveyor to assist in the pivoting of the cases about the pivot axis. In another version, the assist roller is tapered with a larger diameter at the second side of the conveyor than at the first side to help pivot the cases about the pivot axis

BRIEF DESCRIPTION OF THE DRAWING

The features of the invention, as well as its aspects and advantages, are better understood by referring to the following description, appended claims, and accompanying drawing, in which:

DETAILED DESCRIPTION

Figure 1A:
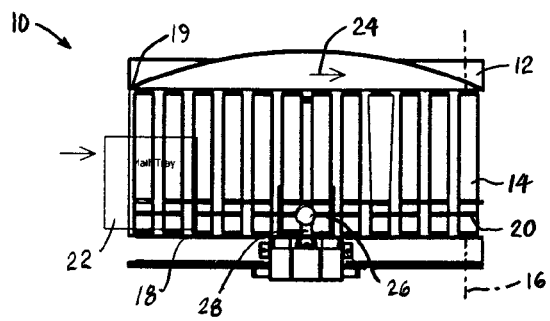
FIGS. 1A-1E are top plan views of a portion of a case turner embodying features of the invention and illustrating sequentially how it turns a case 90°.
Figure 1B:
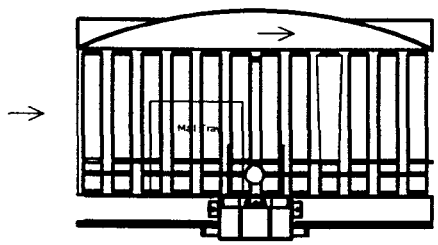
Figure 1C:
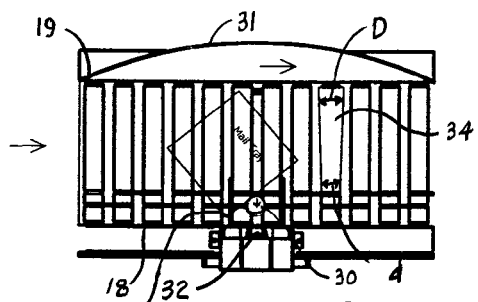
Figure 1D:
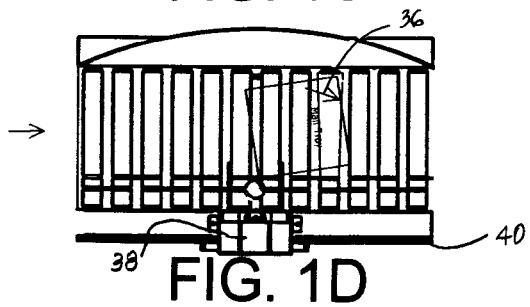
Figure 1E:
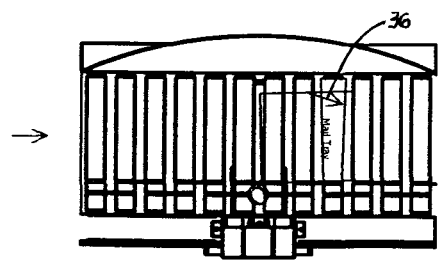

One version of a case turner embodying features of the invention is shown in FIGS. 1A-1E. The case turner 10 comprises a powered roller conveyor 12 having a plurality of cylindrical rollers 14 mounted with their axes of rotation 16 perpendicular to opposite sides 18, 19 of the conveyor. The rollers' axles are supported in the sides of the conveyor, which define the conveyor's width. The rollers are rotated about their axes of rotation by series of belts 20 transmitting rotational drive from one belt to the next. All the rollers rotate in the same direction to propel cases, such as mail trays 22, supported atop the rollers along the length of the conveyor in a downstream direction 24.

Extending outward from the first side 18 of the conveyor is turning wheel 26 at the end of an arm 28 to form a bump turn that turns cases that bump into it 90°. The arm, which is mounted to support structure 29 below the carryway of the belt, supports an axle on which the wheel rotates. The wheel forms a rotatable obstruction that extends out into the flow of cases. When a case is intercepted by the wheel, the action of the rollers on the bottom of the case cause it to rotate about the wheel toward the opposite second side 19 of the conveyor as in FIG. 1C. Thus, the wheel's axle defines a vertical pivot axis 30 about which intercepted cases pivot—clockwise in FIGS. 1C-1E. A side rail 31 at the second side of the conveyor bows outward opposite the bump turn to accommodate larger turning cases.

To help lightweight cases to complete a 90° turn, an assist roller 34 is positioned parallel to the other rollers downstream of the pivot axis 30. In this example, a standard roller resides between the assist roller and the obstruction. Preferably the assist roller is spaced close enough to the obstruction that cases can contact both the assist roller and the obstruction simultaneously. The assist roller is preferable a linearly tapered roller with a larger diameter D at the side 19 of the conveyor opposite the pivot point than at the first side 18. Because all the rollers are rotated at the same angular speed and the tangential speed of any roller is proportional to its diameter, the tangential speed of the assist roller at the second side of the conveyor is greater than its tangential speed at the first side, where its diameter d is smaller. The other rollers, which are standard roller-conveyor rollers of constant diameter, such as diameter d like the smaller-diameter end of the assist roller, rotate with a tangential speed less than the tapered roller at the second side of the conveyor. Furthermore, because the diameter D of the tapered assist roller at the second side of the conveyor is greater than the diameter of the other rollers, the portion of the assist roller toward the second side is elevated above the level of the topmost points of the other rollers. Thus, a case encountering the tapered assist roller downstream of the pivot point, but while still contacting the obstruction, "sees" an increasing tangential roller speed and an increasing roller tilt toward the second side of the conveyor that elevates the case above the nearby standard rollers at the second side to reduce drag on the bottom of the case. The increasing roller speed and tilt and the reduced drag help the case complete its 90° turn about the pivot axis as indicated by the arrow 36 in FIGS. 1D and 1E.

Although the invention has been described in detail with respect to a preferred version, other versions are possible. For example, the turning wheel that lowers the frictional contact with the case may be replaced by a non-rotatable post. As another example, the obstruction's arm may be fixed or selectively retractable by an actuator 32, such as a linear actuator, to allow selected cases to pass without turning. And the actuator may be mounted on a trolley 38 that rides along a rail 40 to allow the bump turn to be positioned at a desired location along the conveyor. So, as these few examples suggest, the scope of the claims is not meant to be limited to the details of the preferred versions.

What is claimed is:

1. A case turner comprising:
   a powered roller conveyor including opposite first and second sides defining the width of the conveyor and a plurality of rollers having axes of rotation perpendicular to the first and second sides and spaced apart along the length of the roller conveyor and rotating to convey supported cases along the length of the conveyor in a downstream direction;

an obstruction defining a vertical pivot axis along the conveyor at a position closer to the first side of the conveyor about which cases in contact with the obstruction pivot toward the second side as the supporting rollers rotate;

wherein at least one of the rollers is an assist roller disposed downstream of the pivot axis and rotating at a higher tangential speed at the second side of the conveyor than at the first side of the conveyor to assist in the pivoting of the cases about the pivot axis; and wherein the assist roller at the second side of the roller conveyor is elevated above the level of the other rollers.

2. A case turner as in claim 1 wherein the assist roller comprises a tapered roller having a larger diameter at the second side of the conveyor than at the first side.

3. A case turner as in claim 2 wherein the larger diameter of the assist roller is greater than the diameter of the other rollers.

4. A case turner as in claim 1 wherein the assist roller rotates at a higher tangential speed at the second side of the conveyor than the other rollers.

5. A case turner as in claim 1 wherein a roller is disposed between the pivot axis and the assist roller.

6. A case turner as in claim 1 wherein the assist roller is positioned close enough to the pivot axis that cases may simultaneously contact both the obstruction and the assist roller.

7. A case turner comprising:
a powered roller conveyor including opposite first and second sides defining the width of the conveyor and a plurality of rollers having axes of rotation perpendicular to the first and second sides and spaced apart along the length of the roller conveyor and rotating to convey supported cases along the length of the conveyor in a downstream direction;

an obstruction defining a vertical pivot axis along the conveyor at a position closer to the first side of the conveyor about which cases in contact with the obstruction pivot toward the second side as the supporting rollers rotate;

wherein at least one of the rollers is a tapered assist roller disposed downstream of the pivot axis and having a larger diameter at the second side of the conveyor than at the first side to assist in the pivoting of the cases about the pivot axis; and wherein the assist roller at the second side of the roller conveyor is elevated above the level of the other rollers.

8. A case turner as in claim 7 wherein the larger diameter of the assist roller is greater than the diameter of the other rollers.

9. A case turner as in claim 7 wherein the assist roller rotates at a higher tangential speed at the second side of the conveyor than the other rollers.

10. A case turner as in claim 7 wherein a roller is disposed between the pivot axis and the assist roller.

11. A case turner as in claim 7 wherein the assist roller is positioned close enough to the pivot axis that cases may simultaneously contact both the obstruction and the assist roller.

* * * * *